F. CORNELIUS & G. SCHATTE.
APPARATUS FOR TRANSFERRING TRACK TRAVERSING VEHICLES FROM ONE SET OF RAILS TO ANOTHER.
APPLICATION FILED NOV. 8, 1909.
981,617.
Patented Jan. 17, 1911.
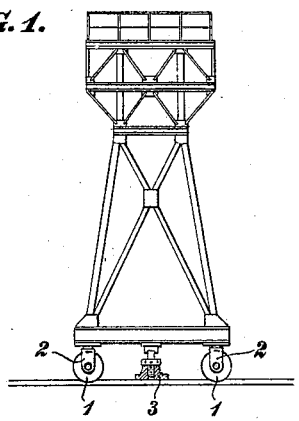
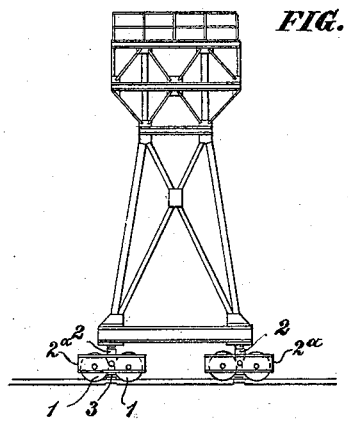
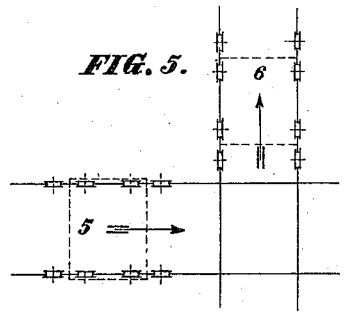
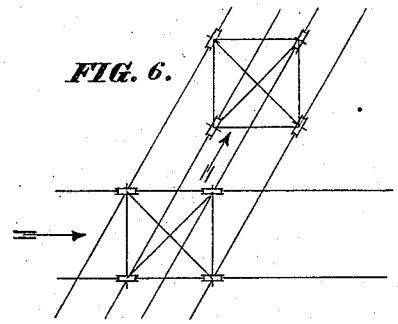
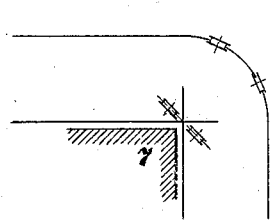
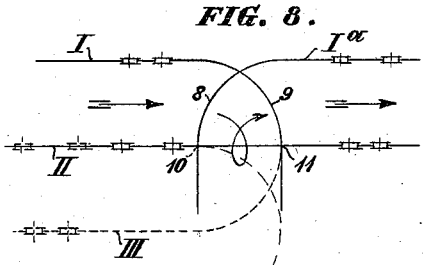
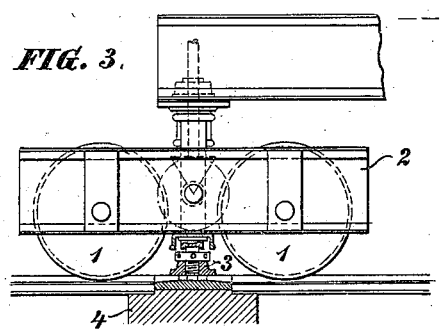
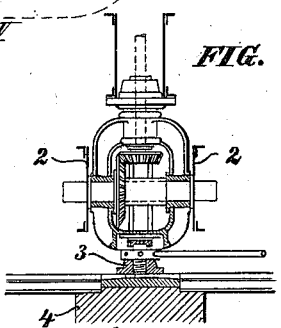

UNITED STATES PATENT OFFICE.

FERDINAND CORNELIUS AND GUSTAV SCHATTE, OF MAGDEBURG, GERMANY, ASSIGNORS TO FRIED. KRUPP AKTIENGESELLSCHAFT GRUSONWERK, OF MAGDEBURG-BUCKAU, GERMANY.

APPARATUS FOR TRANSFERRING TRACK-TRAVERSING VEHICLES FROM ONE SET OF RAILS TO ANOTHER.

981,617.   Specification of Letters Patent.   Patented Jan. 17, 1911.

Application filed November 8, 1909. Serial No. 526,925.

*To all whom it may concern:*

Be it known that we, FERDINAND CORNELIUS and GUSTAV SCHATTE, subjects of the King of Prussia, and residents of Magdeburg, Kingdom of Prussia, Empire of Germany, have invented new and useful Improvements in Apparatus for Transferring Track-Traversing Vehicles from One Set of Rails to Another, of which the following is a specification.

This invention relates to apparatus for transferring traveling cranes, loading frames, traverse tables and other vehicles from one set of rails to another which may be running parallel therewith or at at any angle thereto. For effecting this purpose, it has been customary to employ a large turn-table to receive the entire vehicle and turn the same into the direction required. Or a separate turn-table has been provided for each intersection of the rails.

The present invention dispenses with the necessity of employing the aforesaid costly turntables and enables the vehicles to be transferred not only onto permanent rails but also onto temporary rails.

According to this invention, each of the vehicle wheels or each group of wheels is arranged to swivel about a vertical axis and between the wheels or groups of wheels on each side of the vehicle or beneath each group of wheels, provision is made for a lifting appliance which may be either permanently or detachably secured to the vehicle and by means of which the latter can be lifted first on one side and then on the other to such an extent as to permit of each wheel or group of wheels being turned into alinement with the particular set of rails onto which it is desired that the vehicle should be transferred. In case of very heavy vehicles each group of wheels can be lifted and adapted to be rotated separately.

The invention further consists in so arranging the track that the range of movements that can be effected by the vehicle are increased and a number of work places situated between several sets of rails can all be served by one vehicle.

In order that the said invention may be clearly understood and readily carried into effect, the same will be described more fully with reference to the accompanying drawings in which:—

Figure 1 is an elevation of a trestle crane embodying the present invention. Fig. 2 is a similar view showing the crane supported by wheels arranged in groups. Figs. 3 and 4 are enlarged views partly in section showing the lifting mechanism applied to a group of wheels. Figs. 5 to 8 are various diagrammatic views showing different arrangements of lines of rails for use in connection with vehicles embodying the present invention.

In the arrangement shown in Fig. 1 the trestle crane is provided with four wheels 1 each of which is arranged to swivel about a vertical axis 2. Interposed between the two wheels on each side of the vehicle is the lifting appliance 3 which may be in the form of an ordinary screw jack as shown in the drawings and be either permanently connected to the vehicle, or be capable of being fitted thereto when required.

In the arrangement shown in Fig. 2 the trestle crane is supported upon four bogies or carriages 2ª each of which is capable of swiveling about a vertical axis 2 and carries two wheels 1. In this arrangement the lifting appliance 3 may be mounted directly underneath the vertical axis of each group of wheels as shown in Figs. 3 and 4 or between any two groups of wheels. When the lifting appliances are likely to be frequently required at predetermined points along the rails, suitable foundations 4 are advantageously provided at such points.

In Fig. 5, 6 indicates two sets of rails intersecting at right angles and in order to transfer the vehicle from one set of rails to the other, it is moved along the rails 5 in the direction indicated by the arrow until the vertical axes of the four groups of wheels come immediately over the points of intersection of the two sets of rails. In this position the lifting appliance at one side of the vehicle is actuated to raise that side to enable the two groups of wheels to be turned into alinement with the rails 6 whereupon the wheels are lowered into engagement with such rails and the operation above described is then repeated with respect to the other side of the vehicle, whereupon the vehicle is capable of being moved along the rails 6 in the direction of the arrow.

Fig. 6 shows two sets of rails intersecting each other obliquely. In this arrangement one set of rails is provided with as many rails as there are vertical axes of the various wheels or groups of wheels, the said rails being so spaced as to come immediately under the vertical axes of the wheels when the vehicle is brought directly over the points of intersection of the two sets of rails. In this position each side of the vehicle is alternately raised and lowered by the lifting appliance, the wheels being turned into alinement with the rails in the manner above described.

It will be observed that in each of the aforesaid arrangements the position of the body of the vehicle remains unchanged, only the wheels being swiveled.

Fig. 7 shows a set of rails arranged closely around the corner of a building 7, the two inner rails intersecting each other at right angles. In this arrangement, if the lifting appliance is applied midway between the two wheels nearest to the building at the point of intersection of the rails, so as to raise the wheels clear of the latter, it constitutes a pivot for the vehicle to turn upon and enables the wheels at the opposite side thereof to travel around the bend of the outer rail. The wheels nearest to the building are then brought into alinement with one or the other of the intersecting rails, whereupon that side of the vehicle is lowered to bring the wheels into engagement with the rail.

Fig. 8 shows two sets of rails so arranged as to enable a vehicle to be turned through an angle of 180°. This is effected by employing three rails I, I$^a$, and II, of which the rails I, I$^a$ are curved at 9 and 8 respectively, with a radius equal to the gage of the track, to intersect the rail II at the points 11 and 10, the distance between such points being equal to the aforesaid radius. By this arrangement the vehicle can be traversed in the direction indicated by the arrow until the point 10 occupies a mid position between the wheels on that side of the vehicle, and upon applying the lifting appliance at this point the vehicle can be swiveled around the bend 9 of the rail I until the wheels on that side of the vehicle occupy a mid position in relation to the point 11. The wheels on the opposite side of the vehicle are now lowered into engagement with the rail I$^a$ and upon applying the lifting appliance at the point 11 the wheels on the opposite side of the vehicle can be traversed over the bend 8 of the rail I$^a$ with the result that the vehicle will have turned through an angle of 180°. It will be obvious that this angle can be increased provided that the centers of the two curved rails I, I$^a$ are maintained at an interval apart equal to the gage of the track.

By arranging the rails as shown by the dotted lines in Fig. 8 it will be seen that a work station can be arranged between each of the adjacent rails I, II, III, IV, with the result that for $n$ work places arranged side by side only $n+1$ rails are necessary and each of such work places can be served by the same vehicle.

The lifting devices can either be operated by hand or mechanically in any convenient manner, for example by means of the apparatus serving for the transportation of the crane.

Having thus described our invention what we claim as new therein and desire to secure by Letters Patent is:—

1. In an apparatus for transferring track traversing vehicles from one set of rails to another, the combination with a vehicle frame, of a series of wheels having swivel-connection about a vertical axis, with two sides of the frame, and lifting means, carried by said frame adjacent to each of the wheels whereby the wheels on each side of the frame may be raised from engagement with the track and swiveled or turned in any desired direction to engage another set of rails.

2. In an apparatus for transferring track traversing vehicles from one set of rails to another, the combination with a frame, a plurality of wheels swivelly connected to two sides of said frame, a plurality of lifting means operable relative to said frame, whereby the wheels on either side of said frame may be raised from engagement with one set of rails and turned or adjusted so as to engage another set of rails extending in a different direction relative to the first set of rails.

3. In an apparatus of the character described, the combination with a plurality of sets of intersecting rails, of a vehicle comprising a series of wheels having swiveled connection with two sides of said vehicle, and engaging one set of rails, and lifting jacks operable relative to said vehicle, whereby the wheels of the vehicle may be raised from engagement with the said set of rails and turned, so as to engage with a set of rails intersecting the first named set of rails.

4. The combination with a vehicle, of a series of wheels swivelly secured thereto and lifting jacks carried by said vehicle, whereby the wheels may be raised from their traction surface and turned in any desired direction.

5. The combination with a vehicle, of a series of wheel carriages secured thereto, a plurality of wheels having swiveled connection with each carriage, and a lifting jack carried by said carriage and positioned intermediate the wheels thereof, whereby the wheels of each may be raised from their traction surface independent of the wheels of the other carriages.

The foregoing specification signed at Magdeburg, Germany, this 23rd day of October, 1909.

FERDINAND CORNELIUS.
GUSTAV SCHATTE.

In presence of—
WILHELM FLEISCHHACK,
JAMES L. A. BURRELL.